(12) United States Patent
Fresko

(10) Patent No.: US 7,293,267 B1
(45) Date of Patent: Nov. 6, 2007

(54) SYSTEM AND METHOD FOR PERFORMING SPECULATIVE INITIALIZATION OF APPLICATION MODELS FOR A CLONED RUNTIME SYSTEM PROCESS

(75) Inventor: Nedim Fresko, San Francisco, CA (US)

(73) Assignee: Sun Microsystems Inc, Santa Clara, CA (US)

( * ) Notice: Subject to any disclaimer, the term of this patent is extended or adjusted under 35 U.S.C. 154(b) by 731 days.

(21) Appl. No.: 10/745,022

(22) Filed: Dec. 22, 2003

(51) Int. Cl.
*G06F 9/44* (2006.01)
*G06F 7/00* (2006.01)

(52) U.S. Cl. .................. 717/166; 717/148; 717/153; 707/102

(58) Field of Classification Search ........ 717/136–167; 718/1; 709/1; 707/102
See application file for complete search history.

(56) References Cited

U.S. PATENT DOCUMENTS

| | | | |
|---|---|---|---|
| 6,584,612 B1 * | 6/2003 | Mueller et al. ............. | 717/166 |
| 6,823,509 B2 * | 11/2004 | Webb ............................ | 718/1 |
| 6,829,761 B1 * | 12/2004 | Sexton et al. ............... | 717/165 |
| 6,865,736 B2 * | 3/2005 | Holmberg et al. .......... | 717/158 |
| 2003/0088604 A1 * | 5/2003 | Kuck et al. ................... | 709/1 |
| 2003/0135658 A1 * | 7/2003 | Haggar et al. .............. | 709/312 |
| 2004/0010787 A1 * | 1/2004 | Traut et al. .................... | 718/1 |
| 2004/0040013 A1 * | 2/2004 | Kalra .......................... | 717/129 |
| 2004/0230973 A1 * | 11/2004 | Cundiff et al. ................. | 718/1 |
| 2005/0240621 A1 * | 10/2005 | Robertson et al. .......... | 707/102 |

OTHER PUBLICATIONS

Procedure cloning Cooper, K.D.; Hall, M.W.; Kennedy, K. Apr. 20-23, 1992 pp. 96-105, IEEE.*
A pre-run-time scheduling algorithm for object-based distributed real-time systems Santhoshkumar, I.; Manimaran, G.; Murthy, C.S. R. Apr. 1-3, 1997 pp. 160-167, IEEE.*
Procedure cloning and integration for converting parallelism from coarse to fine grain Won So; Dean, A. Feb. 8, 2003 pp. 27-36, IEEE.*
A pre-run-time scheduling algorithm for object-based distributed real-time systems, Santhoshkumar, I.; Manimaran, G.; Murthy, C.S.R., Parallel and Distributed Real-Time Systems, 1997. Proceedings of the Joint Workshop on Apr. 1-3, 1997, IEEE, pp. 160-167.*

(Continued)

*Primary Examiner*—Wei Zhen
*Assistant Examiner*—Satish S Rampuria
(74) *Attorney, Agent, or Firm*—Park, Vaughan & Fleming LLP

(57) ABSTRACT

A system and method for performing speculative initialization of application models for a cloned runtime system process is presented. A class loader is created for each application model. Each such class loader includes a representation of at least one class from a source definition provided as object-oriented program code and associated with the application model. A master runtime system process is executed. The representation of the class loader is interpreted, instantiated and warmed up as an application model specific class loader instance in a memory space of the master runtime system process. The memory space is cloned as a child runtime system process responsive to a process request and the child runtime system process is executed. The child runtime process selects one such application model specific class loader instance, rather than creating a new application model specific class loader instance.

26 Claims, 12 Drawing Sheets

OTHER PUBLICATIONS

Checkpoints-on-demand with active replication, Rangarajan, S.; Garg, S.; Yennun Huang, Reliable Distributed Systems, 1998. Proceedings. Seventeenth IEEE Symposium on, Oct. 20-23, 1998, IEEE, pp. 75-83.*

Procedure cloning and integration for converting parallelism from coarse to fine grain, Won So; Dean, A., Interaction Between Compilers and Computer Architectures, 2003. INTERACT-7 2003. Proceedings. Seventh Workshop on Feb. 8, 2003, IEEE, pp. 27-36.*

* cited by examiner

60

90

120

130

SYSTEM AND METHOD FOR PERFORMING SPECULATIVE INITIALIZATION OF APPLICATION MODELS FOR A CLONED RUNTIME SYSTEM PROCESS

FIELD OF THE INVENTION

The invention relates in general to speculative initialization and, in particular, to a system and method for performing speculative initialization of application models for a cloned runtime system process.

BACKGROUND OF THE INVENTION

Recent advances in microprocessor design and component integration have enabled a wide range of devices to offer increasingly complex functionality and "soft" features. Soft features include software applications that enhance and customize the operation of a device. These devices include standard computing devices, such as desktop and laptop computers, portable computing devices, such as personal data assistants, and consumer devices, such as cellular telephones, messaging pagers, gaming consoles, and set top boxes. Most devices now include an operating system to support the soft features and other extensions.

The increased capabilities offered by these software-upgradeable devices have also created certain user expectations. Often, users are not technically savvy and are intolerant of performance compromises occasioned by architectural challenges, such as slow or inconsistent application performance. Similarly, users generally expect to be able to access a host of separate applications, which are implemented at the system level through multitasking. For users, widely available software applications assure a positive experience through consistency and increased exposure across multiple platforms. However, for software developers, engineering software applications for disparate computing platforms entails increased development costs and ongoing support and upgrade commitments for each supported architecture.

Managed code platforms provide one solution to software developers seeking to support multiple platforms by presenting a machine-independent and architecture-neutral operating environment. Managed code platforms include programming language compilers and interpreters executed by an operating system as user applications, but which provide virtual runtime environments within which compatible applications can operate. For instance, applications written in the Java™ programming language, when combined with a Java virtual machine™ (JVM™) runtime environment, can operate on heterogeneous computer systems independent of machine-specific environment and configuration settings. (Note that the terms Java™, JVM™ and Java virtual machine™ are trademarks of SUN Microsystems, Inc. of Santa Clara, Calif.). An overview of the Java programming language is described in P. van der Linden, "Just Java," Ch. 1, Sun Microsystems, Inc. (2d ed. 1997), the disclosure of which is incorporated by reference. JVMs are a critical component to the overall Java operating environment, which can be ported to the full range of computational devices, including memory-constrained consumer devices.

Managed code platforms are generally designed for the monotonic execution of a single application instance. Multiple instances of a managed code platform are executed to simulate multitasking behavior. Such forced concurrency, however, creates several performance problems. First, each instance incurs a startup transient. Executable and startup data must be read from slow persistent storage, which results in slow initial application performance. Similarly, memory is not shared between instances and each additional instance increases the overall memory footprint of the platform by separately loading and instantiating classes, generally problematic in memory-constrained systems. Moreover, data dependencies and deferred initialization of system state can result in non-deterministic execution patterns. Finally, each instance independently determines the relative importance of executing methods and compiles machine code on an ad hoc basis, often causing inconsistent application performance.

Managed code platforms introduce an intermediate layer of interoperability between applications and the underlying system. Through a managed code platform, a compliant managed code application can access system resources and provide functionality analogous to native-mode applications, which operate directly within the system environment. However, for security reasons and due to resource constraints, the control over and access to system resources that is afforded to managed code applications should be managed. One solution, application models, can be used to logically define the management roles and divisions of responsibility between the applications and the system. Application models can specify, for instance, how an application is started or stopped, when the application can access system resources, and how an application discovers initialization parameters, typically through class and data structure definitions.

For efficiency or business reasons, multiple application models can be supported on a single hybrid device. Managed code applications can be executed based on any of the available application models, which provide different operating environments, including application classes, library methods and data structures that can only be shared within the model instance. Application models are implemented through class loaders, which are executed by the runtime system process for each supported application model, to generate cached class instances and data, as well as allow encapsulation and segregation of namespaces. An application is normally started by creating a class loader matching the application model for the application and requesting classes via the class loader instance, which can consumes an increasing amount of processor and memory resources for each subsequently executed application. Moreover, executing individual class loaders for separate application models can be problematic for resource constrained devices, where boot startup time is critical and a combination of slower processor performance and persistent storage access and modest memory sizes can cause significant boot times.

Therefore, there is a need for an approach to providing speculative initialization of warmed-up activities for providing a plurality of application models in a managed code platform, such as the Java operating environment. Preferably, a class loader for each managed class would be instantiated and initialized prior to invocation of classes or data structures defined relative to each application model. There is a further need for an approach to aligning the addresses of instructions of cached code for class instances and data shared between spawned runtime system processes at underlying operating system page boundaries.

SUMMARY OF THE INVENTION

A managed code platform is executed in an application framework that supports the spawning of multiple and independent isolated user applications. Preferably, the application framework supports the cloning of the memory space of each user application using copy-on-write semantics. The managed code platform includes a master runtime system process, such as a virtual machine, to interpret machine-portable code defining compatible applications. An application manager also executes within the application framework and is communicatively interfaced to the master runtime system process through an inter-process communication mechanism. The application framework logically copies the master runtime system process context upon request by the application framework to create a child runtime system process through process cloning. The context of the master runtime system process stored in memory is inherited by the child runtime system process as prewarmed state and cached code. When implemented with copy-on-write semantics, the process cloning creates a logical copy of references to the master runtime system process context. Segments of the referenced master runtime system process context are lazily copied only upon an attempt by the child runtime system process to modify the referenced context. During initialization, the master runtime system process executes class loaders defining one or more application models and non-sharable methods are compiled and instantiated into application model-specific code caches. The addresses of the application model-specific code caches are preferably aligned at underlying operating system page boundaries. An example of a suitable managed code platform and runtime system process are the Java operating environment and Java virtual machine (JVM) architecture, as licensed by Sun Microsystems, Inc., Palo Alto, Calif.

One embodiment provides a system and method for performing speculative initialization of application models for a cloned runtime system process. A class loader is created for each application model. Each such class loader includes a representation of at least one class from a source definition provided as object-oriented program code and associated with the application model. A master runtime system process is executed. The representation of the class loader is interpreted, instantiated and warmed up as an application model specific class loader instance in a memory space of the master runtime system process. The memory space is cloned as a child runtime system process responsive to a process request and the child runtime system process is executed. The child runtime process selects one such application model specific class loader instance, rather than creating a new application model specific class loader instance.

The use of the process cloning mechanism provided by the underlying application framework provides several benefits in addition to resolving the need for efficient concurrent application execution of machine portable code. The inheritance of prewarmed state through the cloning of the master runtime process context provides inter-process sharing of prewarmed state, including application model-specific class loader instances and methods instantiated into segregated code caches. Similarly, each child runtime system process executes in isolation of each other process, thereby providing strong resource control through the system level services of the application framework. Isolation, reliable process invocation and termination, and resource reclamation are available and cleanly provided at an operating system level. In addition, process cloning provides fast user application initialization and deterministic runtime behavior, particularly for environments providing process cloning with copy-on-write semantics. Finally, for non-shareable segments of the master runtime system process context, actual copying is deferred until required through copy-on-write semantics, which avoids impacting application performance until, and if, the segment is required.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

System Overview

Figure 1:
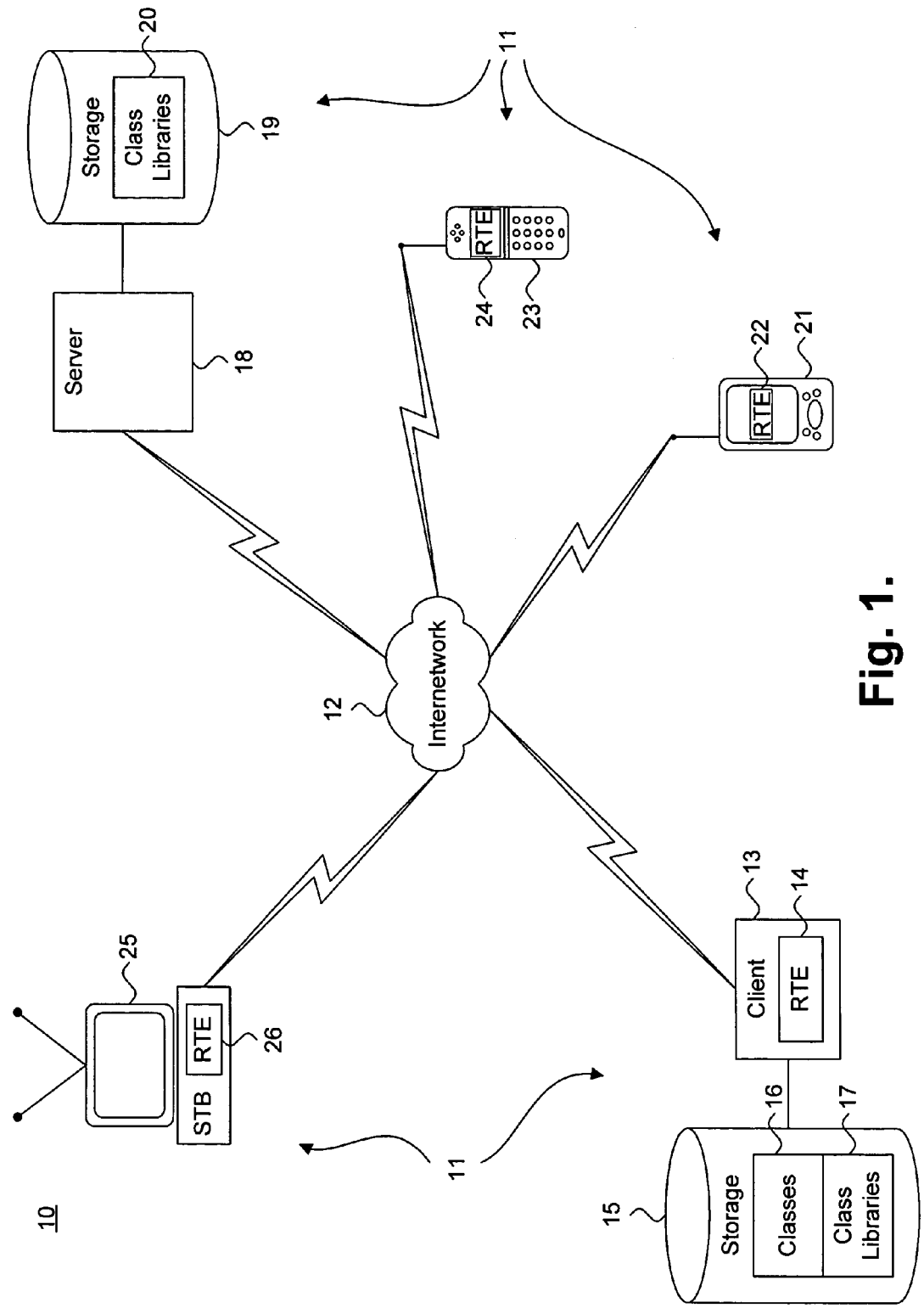
FIG. 1 is a functional block diagram showing, by way of example, runtime environments implemented on a plurality of heterogeneous devices.

FIG. 1 is a functional block diagram 10 showing, by way of example, runtime environments (RTEs) 14, 22, 24, 26 implemented on a plurality of heterogeneous devices 11. Each heterogeneous device 11 provides a managed code platform, such as the Java operating environment, executing in a runtime environment 14, 22, 24, 26, as further described below with reference to FIG. 2. The heterogeneous devices 11 include, nonexclusively, a client computer system 13, such as a desktop or laptop computer system. Each client 13 is operatively coupled to a storage device 15 and maintains a set of classes 16 and class libraries 17, which respectively define code modules that specify data structures and sets of methods that operate on the data, and shareable collections of the modules. The heterogeneous devices 11 also include portable computing devices, including personal data assistants 21, and consumer devices, such as cellular telephones 23 and set top boxes (STB) 25. Finally, a server 18 is operatively coupled to a storage device 19 in which globally shareable class libraries 20 are maintained. Each of the heterogeneous devices 11 can interface via a network 12, which includes conventional hardwired and wireless network configurations. Other types of heterogeneous devices 11 and various network configurations, arrangements, and topologies are possible.

Each heterogeneous device 11 includes an operating system to manage resources, provide access to peripheral devices, allocate memory resources, and control program execution and termination. Each operating system supports a process cloning mechanism that spawns multiple and independent isolated user applications by cloning the memory space of specifiable processes. An example of a process cloning mechanism suitable for use in the present invention is the fork( ) system call provided by the Unix™ or Linux™ operating systems, such as described in M. J. Bach, "The Design Of The Unix Operating System," Ch. 7, Bell Tele. Labs., Inc. (1986), the disclosure of which is incorporated by reference. (Note that the term Unix™ is a registered trademark of The Open Group and that the term Linux™ is registered trademark of Linus Torvalds). The process invoking the fork( ) system call is known as the parent process and the newly created process is called the child process. The operating system assigns a separate process identifier to the child process, which executes as a separate process. The operating system also creates a logical copy of the context of the parent process by copying the memory space of the parent process into the memory space of the child process. In a copy-on-write variant of the fork( ) system call, the operating system only copies references to the memory space and defers actually copying individual memory space segments until, and if, the child process attempts to modify the referenced data of the parent process context. The copy-on-write fork( ) system call is faster than the non-copy-on-write fork( ) system call and implicitly shares any data not written into between the parent and child processes.

System for Performing Speculative Initialization

Figure 2:
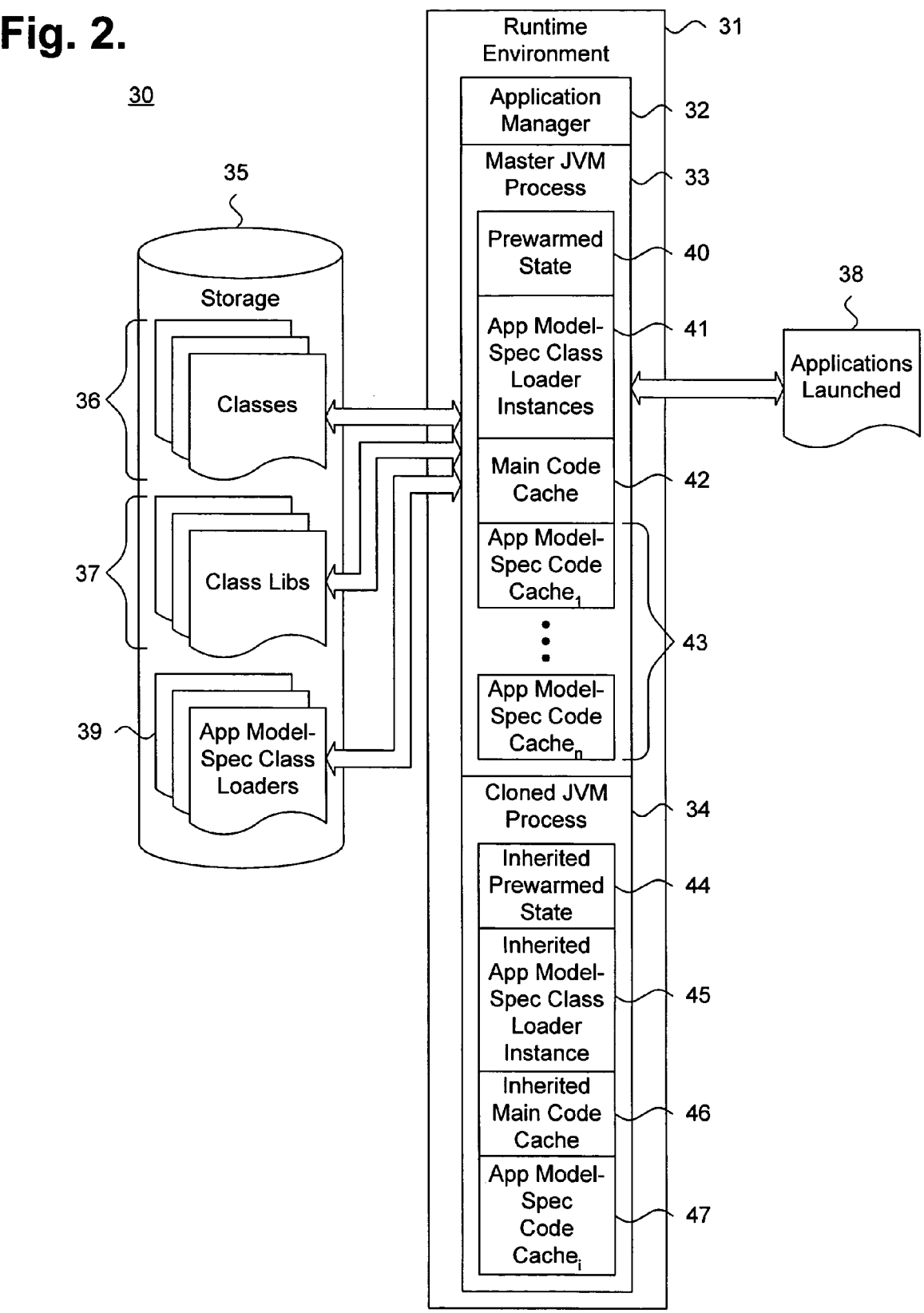
FIG. 2 is a block diagram showing a system for performing speculative initialization of application models for a cloned runtime system process, in accordance with the invention.

FIG. 2 is a block diagram 30 showing a system for performing speculative initialization of application models for a cloned runtime system process 33, in accordance with the invention. By way of example, the system is described with reference to the Java operating environment, although other forms of managed code platforms that execute applications preferably written in an object oriented programming language, such as the Java programming language, could also be used.

The exemplary runtime environment 31 includes an application manager 32, master Java virtual machine (JVM) process 33 and zero or more cloned JVM processes 34. The master JVM process 33 and cloned JVM processes 34 respectively correspond to a master runtime system process and child runtime system processes. The master runtime system process, preferably provided as a virtual machine, interprets machine-portable code defining compatible applications. The runtime environment 31 need not execute cloned JVM processes 34, which are only invoked upon request by the application manager 32.

The runtime environment 31 supports hybrid systems and includes one or more application models that logically define the management roles and responsibility divisions between applications executed on the master JVM process 33 and cloned JVM processes 34 and the underlying system. The application models are implemented through corresponding application model-specific class loaders 39, which are initialized and warmed up by the master JVM process 33 for each supported application model at device boot time. Several different types of application models are available in the Java operating environment. These application models non-exclusively include traditional applications, Applets, MIDlets, and Xlets, such as available in Java 2 Platform Micro Edition (J2ME). Traditional applications, or simply, "applications," are loaded directly by a JVM process and will run until self-terminated. Applets run under the control of a Web browser and is closely linked to the Web page within which the applet is contained. MIDlets are Mobile Information Device Profiles that are managed by special purpose application management software built into a device, such as a cellular telephone or interactive pager. Xlets are also managed by special purpose application management software. Other types of application models and control schemes are possible.

The runtime environment 31 executes an application framework that spawns multiple independent and isolated user application process instances by preferably cloning the memory space of a master runtime system process. The example of an application framework suitable for use in the present invention is the Unix operating system, such as described generally in M. J. Bach, supra at Ch. 2, the disclosure of which is incorporated by reference.

The application manager 32 presents a user interface through which individual applications can be selected and executed. The application manager 32 and master JVM process 33 preferably communicate via an inter-process communication (IPC) mechanism, such as a pipe or a socket. The master JVM process 33 is started at device boot time.

Upon initialization, the master JVM process 33 reads an executable process image from the storage device 35 and performs bootstrapping operations. These operations include performing speculative initialization, as further described below with reference to FIG. 10. Thus, upon completion of initialization, the memory image of the master JVM process 33 resembles that of an initialized, primed and warmed up JVM process with key classes stored in the master JVM process context as prewarmed state 41.

Following the initialization, the master JVM process 33 idles, that is, "sleeps" in an inactive state, while awaiting further instructions from the application manager 32. The master JVM process 33 awakens in response to requests received from the application manager 32 to execute applications. The application manager 32 sends a request to the master JVM process 33, including standard command line parameters, such as application name, class path, and application arguments. The master JVM process 33 awakens and creates a cloned JVM process 34 as a new cloned process instance of the master JVM process 33 using the process cloning mechanism of the underlying operating system. The context of the master JVM process 33 stored in memory as prewarmed state 41 is inherited by the cloned JVM process 34 as inherited prewarmed state 44, thereby saving initialization and runtime execution times and providing deterministic execution behavior. Following the "cloning" of the cloned JVM process 34, the master JVM process 33 records the launched application in an applications launched list 38 and returns to an inactive sleep state.

When implemented with copy-on-write semantics, the process cloning creates a logical copy of only the references to the master JVM process context. Segments of the referenced master JVM process context are lazily copied only upon an attempt by the cloned JVM process to modify the referenced context. Therefore, as long as the cloned JVM process does not write into a memory segment, the segment remains shared between parent and child processes.

The master JVM process 33 recognizes the following basic commands received from the application manager 32 through the IPC mechanism:

(1) list: Provides a list of applications launched in response to requests received from the application manager 32.

2) jexec: Invokes the process cloning mechanism, parses command line arguments and executes a new instance of the master JVM process 33 as the cloned JVM process 34. Preferably adopts a syntax compatible to standard JVM processes.

3) kill: Terminates the application identified by an application handle or process identifier.

Other commands are possible, such as described in commonly-assigned U.S. patent application Ser. No. 10/745,164, entitled "System And Method For Performing Incremental Initialization Of A Master Runtime System Process," filed 22 Dec. 2003, pending, the disclosure of which is incorporated by reference.

During initialization, the master JVM process 33 also speculatively initializes one or more application models. Each application model is specified in an application model-specific class loader 39 as a set of classes 36, classes defined in the class libraries 37 and data structures. The application model-specific class loaders 39 are executed to initialize the data structures and compile any methods defined on the classes into a set of application model-specific code cache 43, as further described below with reference to FIG. 10.

An instance of each application model-specific class loader 41 is instantiated into the master JVM process 33. When spawned, each cloned JVM process 34 inherits all of the initialized and warmed up applicable class loader instances 41 from the master JVM process 33 into the memory space of the cloned JVM process 34 as inherited application model-specific class loader instances 45. Those methods sharable between individual applications are still compiled by the master JVM process 33 into a main code cache 42, which is inherited into the cloned JVM process 34 as an inherited main code cache 46. However, methods that are unique to each application model and are not sharable are compiled into separate application model-specific code caches 43. When spawned, each cloned JVM process 34 inherits all of the initialized and warmed up application model-specific code caches 43 from the master JVM process 33 into the memory space of the cloned JVM process 34 as inherited application model-specific code caches 47.

In one embodiment, if the memory space is implemented with copy-on-write semantics, each cloned JVM process 34 creates a logical copy of all of the initialized and warmed up applicable class loader instances 41 and initialized and warmed up application model-specific code caches 43. At runtime, each cloned JVM process 34 selects only one application model-specific class loader instance 41 and only one application model-specific code cache 43 as relevant to the application model implemented by the cloned JVM process 34. Thus, memory space is only consumed within the cloned JVM process 34 for a single application model-specific class loader instance 41 and a single application model-specific code cache 43.

In a further embodiment, the addresses of the application model-specific code caches 43 are preferably aligned on separate underlying operating system page boundaries to facilitate efficient memory utilization in cloned JVM processes 34 that are spawned with process cloning with copy-on-write semantics and to prevent unnecessary copy-on-write page allocations by the underlying operating system. The application model-specific code cache 43 remains shared until the cloned JVM process 34 attempts to modify the memory page, at which point only the memory page storing the application model-specific code cache 43 is physically copied, thereby avoiding needlessly copying other unaffected data, such as other application model-specific code caches 43.

Master JVM Process Mapping

Figure 3:
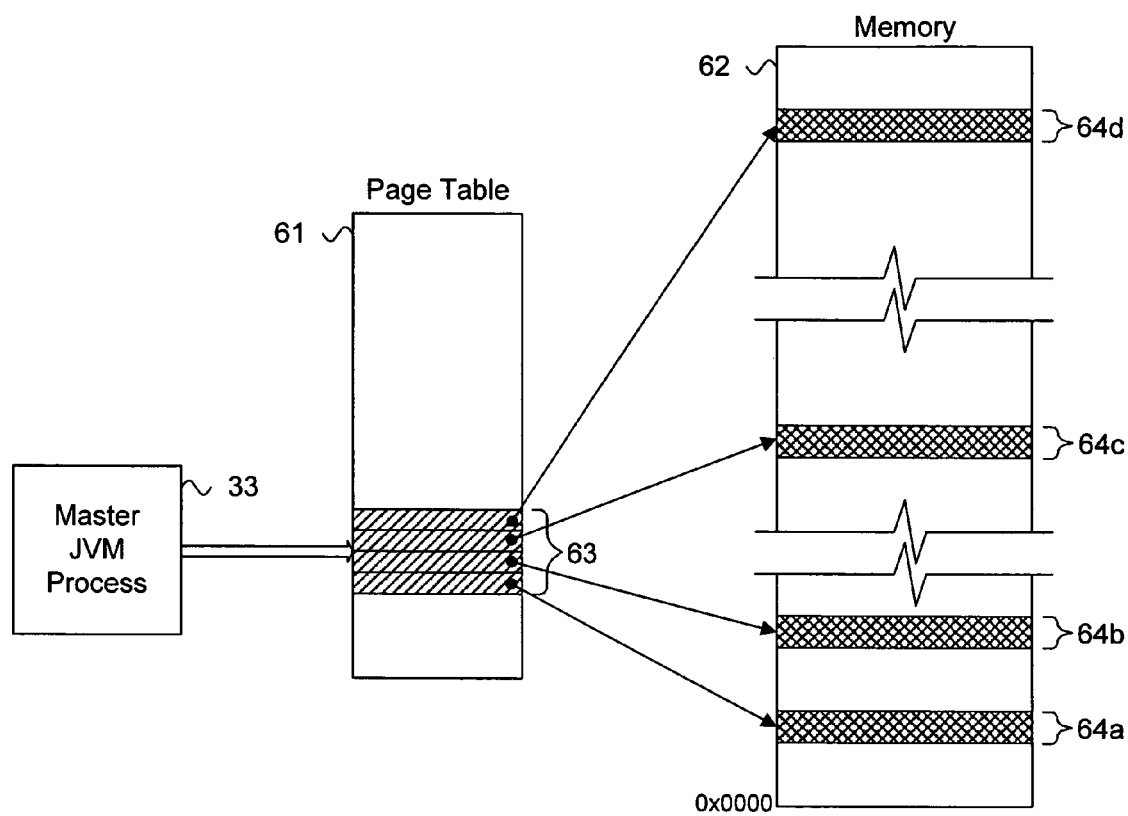
FIG. 3 is a block diagram showing, by way of example, a master JVM process mapped into memory.

FIG. 3 is a block diagram 60 showing, by way of example, a master JVM process 33 mapped into memory 62. Generally, the context for an executing process includes a data space, user stack, kernel stack, and a user area that lists open files, current directory and supervisory permission settings. Other types of context can also be provided. The context is stored and managed in the memory 62 by the operating system. At device boot time, the operating system instantiates a representation of the executable master JVM process 33 into the memory 62, possibly in non-contiguous pages 64*a-d*, and records the allocation of the memory space as page table entries 63 into the page table 61 prior to commencing execution of the master JVM process 33. As well, the master JVM process context could similarly be mapped using other memory management systems, such as using demand paging, swapping and similar process memory allocation schemes compatible with process cloning, particularly process cloning with copy-on-write semantics.

Cloned JVM Process Mapping

Figure 4:
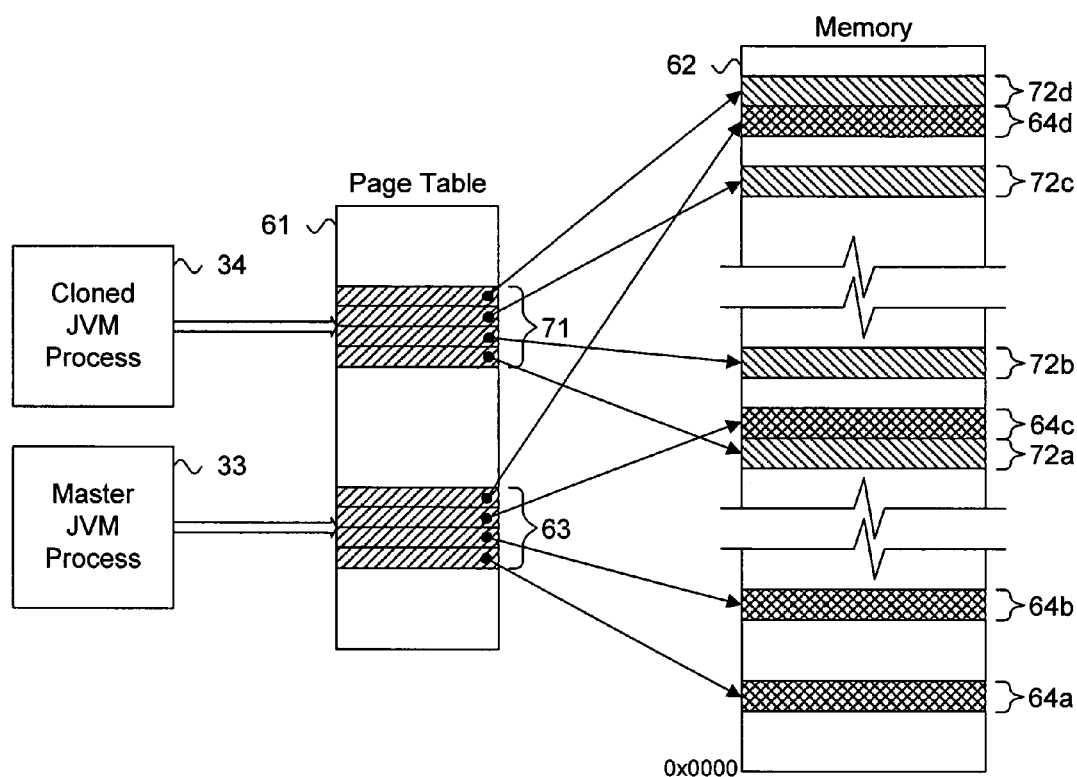
FIG. 4 is a block diagram showing, by way of example, a master JVM process and a cloned JVM process mapped into memory through memory space cloning.

FIG. 4 is a block diagram 70 showing, by way of example, a master JVM process 33 and a cloned JVM process 34 mapped into memory 62 through memory space cloning. In a system with process cloning that does not provide copy-on-write semantics, physical copies of the pages 64*a-c* in the memory 62 storing the parent process context are created for each child process. In response to a process cloning request, the operating system instantiates a copy of the representation of the executable master JVM process 33 for the cloned JVM process 34 into the memory 62, possibly in non-contiguous pages 72*a-d*, and records the allocation of the memory space as page table entries 71 into the page table 61 prior to commencing execution of the cloned JVM process 34. Thus, the cloned JVM process 34 is created with a physical copy of the context of the master JVM process 33. Since a new, separate physical copy of the master JVM process context is created, the cloned JVM process 34 inherits the prewarmed state 41, including the application-model specific class loader instances 41 and one or more application model-specific code cache 43 from the master JVM process 33. However, the overall memory footprint of the runtime environment 31 is increased by the memory space required to store the additional copy of the master JVM process context.

Cloned JVM Process Mapping with Copy-on-Write

Figure 5A:
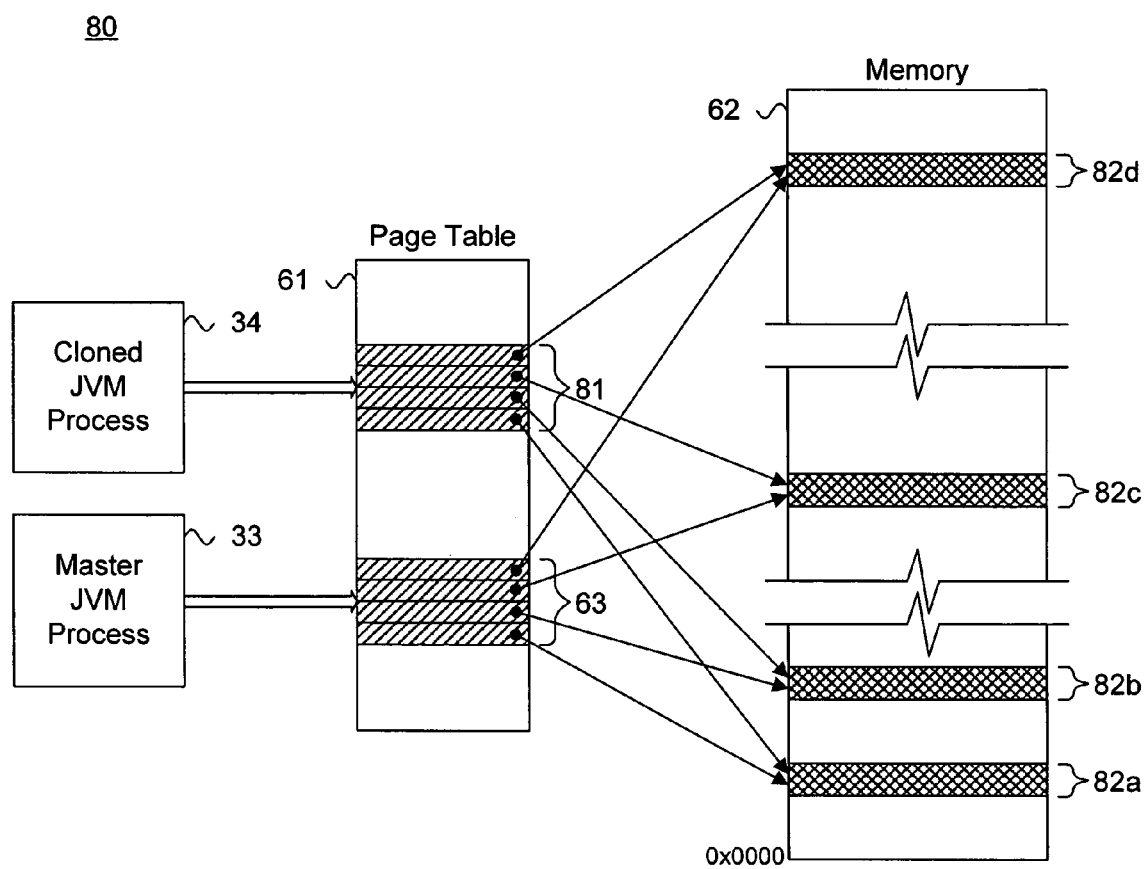
FIGS. 5A-B are block diagrams showing, by way of example, a master JVM process and a cloned JVM process mapped into memory through memory space cloning with copy-on-write semantics.
Figure 5B:
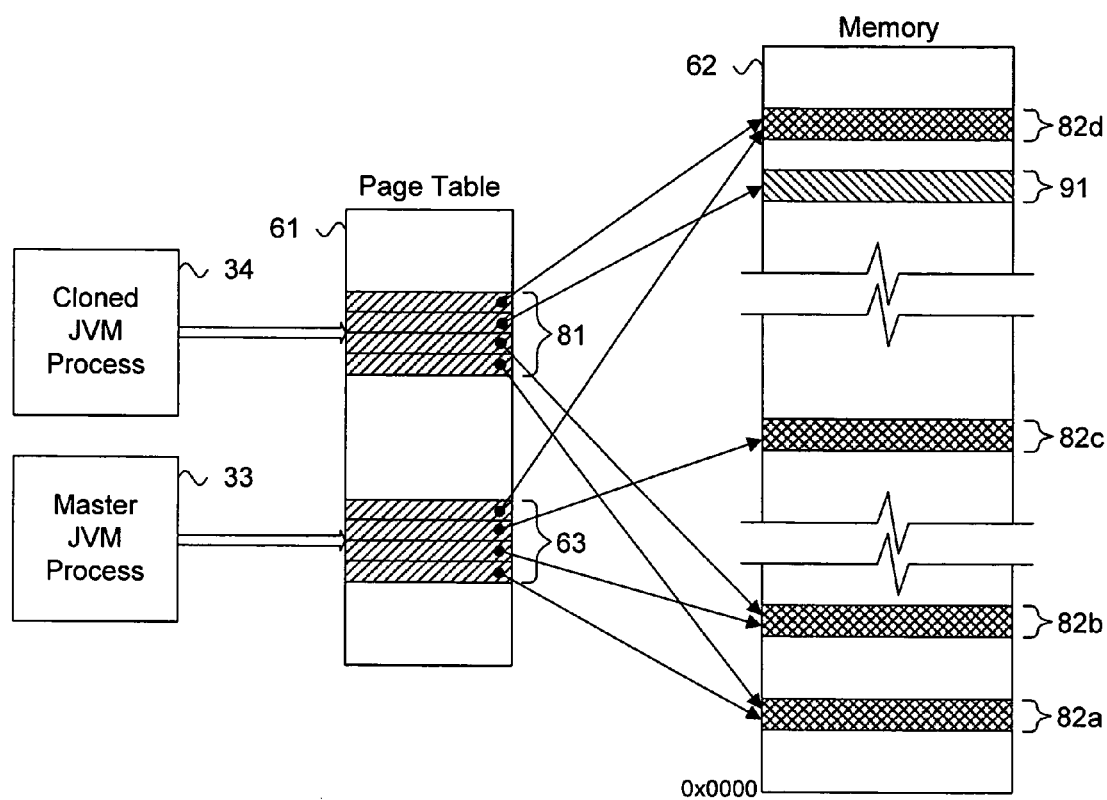

FIGS. 5A-B are block diagrams 80, 90 showing, by way of example, a master JVM process 33 and a cloned JVM process 34 mapped into memory 62 through memory space cloning with copy-on-write semantics. In a system with process cloning that provides copy-on-write semantics, only copies of the references, typically page table entries, to the memory space storing the parent process context are created for each child process. Referring first to FIG. 5A, in response to a process cloning request, the operating system copies only the page table entries 63 referencing the memory space of the executable master JVM process 33 as a new set of page table entries 81 for the cloned JVM process 34. Thus, the cloned JVM process 34 uses the same references to the possibly non-contiguous pages 64a-d storing the master JVM process context as the master JVM process 34. Initialization and execution of the application associated with the cloned JVM process 34 requires less time, as only the page table entries 62 are copied to clone the master JVM process context. Furthermore, until the cloned JVM process 34 attempts to modify the master JVM process context, the memory space is treated as read only data, which can be shared by other processes.

Referring next to FIG. 5B, the cloned JVM process 34 has attempted to modify one of the pages 82c in the memory space of the master JVM process context. In response, the operating system creates a physical copy of the to-be-modified memory space page 82c as a new page 91 and updates the allocation in the page table entries 81 for the cloned JVM process 34. Through copy-on-write semantics, the overall footprint of the runtime environment 31 is maintained as small as possible and only grows until, and if, each cloned JVM process 34 actually requires additional memory space for application-specific context.

Method for Performing Speculative Initialization

Figure 6:
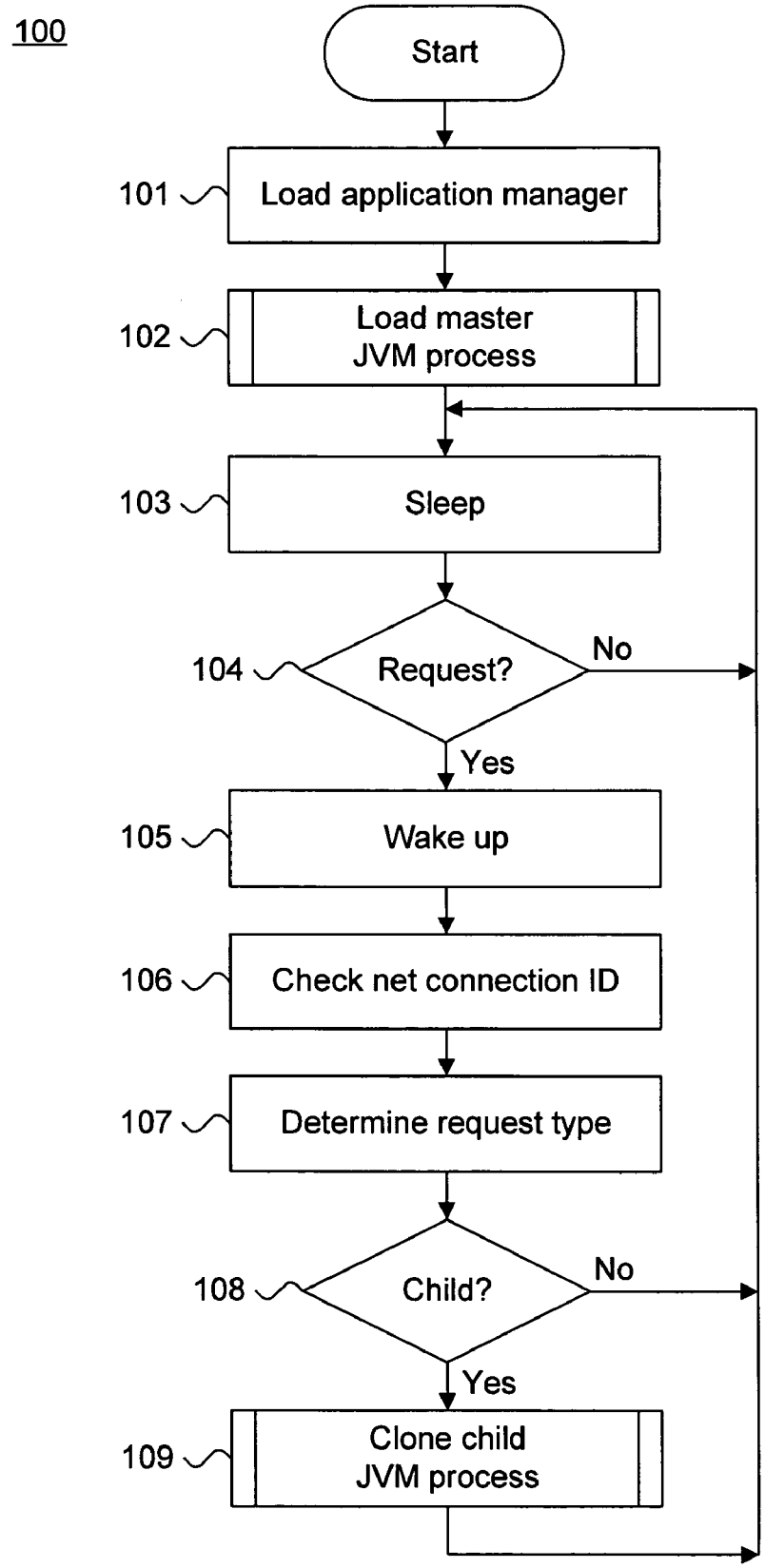
FIG. 6 is a flow diagram showing a method for performing speculative initialization of application models for a cloned runtime system process, in accordance with the invention.

FIG. 6 is a flow diagram, showing a method 100 for performing speculative initialization of application models for a cloned runtime system process, in accordance with the invention. The method 100 is described as a sequence of process operations or steps, which can be executed, for instance, by the runtime environment 31 of FIG. 2 or other components.

Initially, the application manager 32 is loaded (block 101). The master JVM process 33 is loaded and initialized at device boot time (block 102), as further described below with reference to FIG. 7. Following loading and initialization, the master JVM process 33 enters an inactive sleep mode (block 103). Upon receiving a request from the application manager 32 (block 104), the master JVM process 33 awakens (block 105). If necessary, the master JVM process 33 checks the network connection identifier (ID) (block 106) for the application manager 32 and determines the type of request (block 107). The master JVM process 33 recognizes the commands list, jexec, and kill, as described above with reference to FIG. 2. If the request type corresponds to a jexec request, instructing the master JVM process 33 to initiate an execution of an application through process cloning (block 108), a cloned JVM process 34 is cloned and executed (block 109), as further described below with reference to FIGS. 8 and 9. Processing continues indefinitely until the master JVM process 33 and the runtime environment 31 are terminated.

Routine for Loading Master JVM Process

Figure 7:
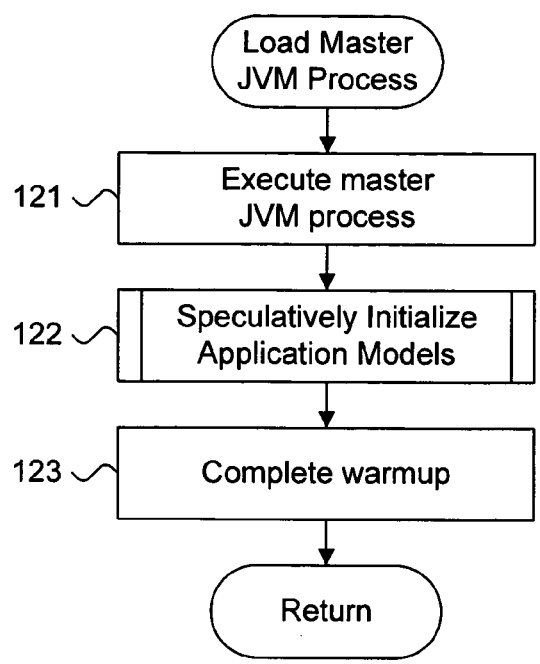
FIG. 7 is a flow diagram showing the routine for loading a master JVM process for use in the method of FIG. 6.

FIG. 7 is a flow diagram showing the routine 120 for loading a master JVM process 33 for use in the method 100 of FIG. 6. One purpose of the routine is to invoke the master JVM process 33 and to speculatively initialize one or more application models by invoking a corresponding application model-specific class loader 39.

Initially, the master JVM process 33 begins execution at device boot time (block 121). The master JVM process 33 then performs speculative initialization as a part of the initialization process (block 122), as further described below with reference to FIG. 10. Briefly, the master JVM process 33 preloads the classes 36 and classes defined in the class libraries 37 as specified in the application model-specific class loader 39 as prewarmed state 41 and as compiled shareable methods and non-sharable methods respectively in the main code cache 42 and applicable application model-specific code cache 43 in the master JVM process 33 for inheritance by a cloned JVM process 34. The master JVM process 33 completes any other warmup operations (block 123), repeatedly for each application model-specific class loader instance. The routine then returns.

Routine for Process Cloning without Copy-on-Write

Figure 8:
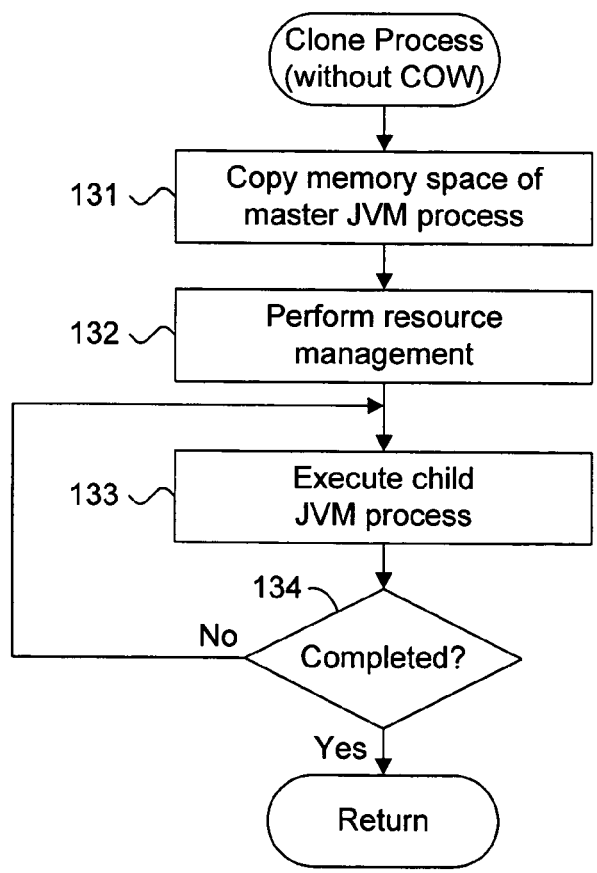
FIG. 8 is a flow diagram showing the routine for cloning a process without copy-on-write semantics for use in the method of FIG. 6.

FIG. 8 is a flow diagram showing the routine 130 for cloning a process without copy-on-write for use in the method 100 of FIG. 6. One purpose of the routine is to create and initiate execution of a cloned JVM process 34 through process cloning that does not provide copy-on-write semantics.

Initially, the memory space containing the context of the master JVM process 33 is physically copied into a new memory space for the cloned JVM process 34 (block 131). Optionally, the master JVM process 33 can set operating system level resource management parameters over the cloned JVM process 34 (block 132), including setting scheduling priorities and limiting processor and memory consumption. Other types of resource management controls are possible. The cloned JVM process 34 is then executed by the runtime environment 31 (block 133) using the duplicated master JVM process context. The routine returns upon the completion (block 134) of the cloned JVM process 34.

Routine for Process Cloning with Copy-on-Write

Figure 9:
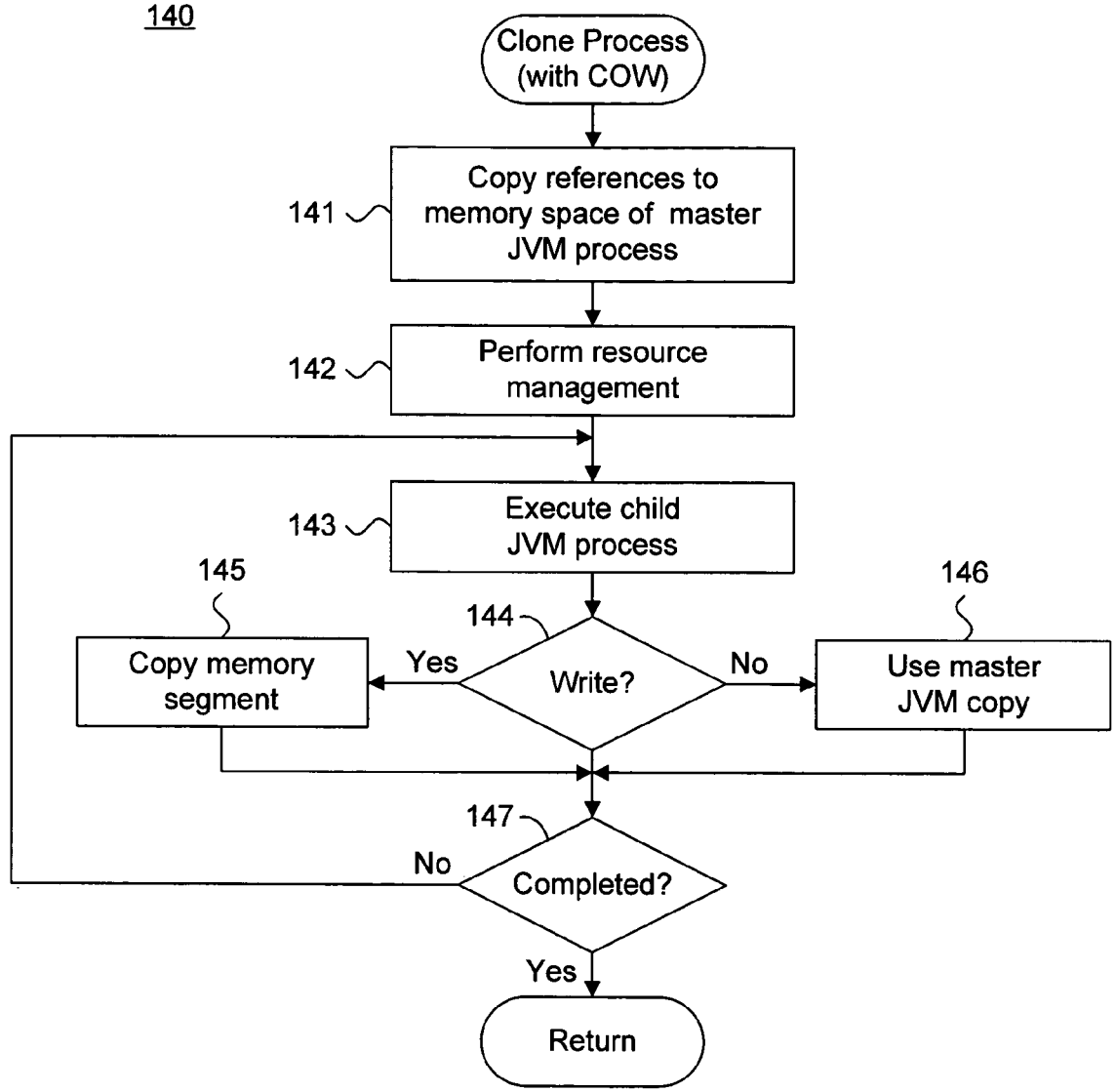
FIG. 9 is a flow diagram showing the routine for cloning a process with copy-on-write semantics for use in the method of FIG. 6.

FIG. 9 is a flow diagram showing the routine 140 for cloning a process with copy-on-write for use in the method 100 of FIG. 6. One purpose of the routine is to create and initiate execution of a cloned JVM process 34 through process cloning that provides copy-on-write semantics.

Initially, references to the memory space containing the context of the master JVM process 33 are copied for the cloned JVM process 34 (block 141). Optionally, the master JVM process 33 can set operating system level resource management parameters over the cloned JVM process 34 (block 142), including setting scheduling priorities and limiting processor and memory consumption. Other types of resource management controls are possible. The cloned JVM process 34 is then executed by the runtime environment 31 (block 143) using the referenced master JVM process context. Each time the cloned JVM process 34 attempts to write into the memory space referenced to the master JVM process context (block 144), the operating system copies the applicable memory segment (block 145). Otherwise, the cloned JVM process 34 continues to use the referenced master JVM process context (block 146), which is treated as read only data. The routine returns upon the completion (block 147) of the cloned JVM process 34.

Routine for Performing Speculative Initialization

Figure 10:
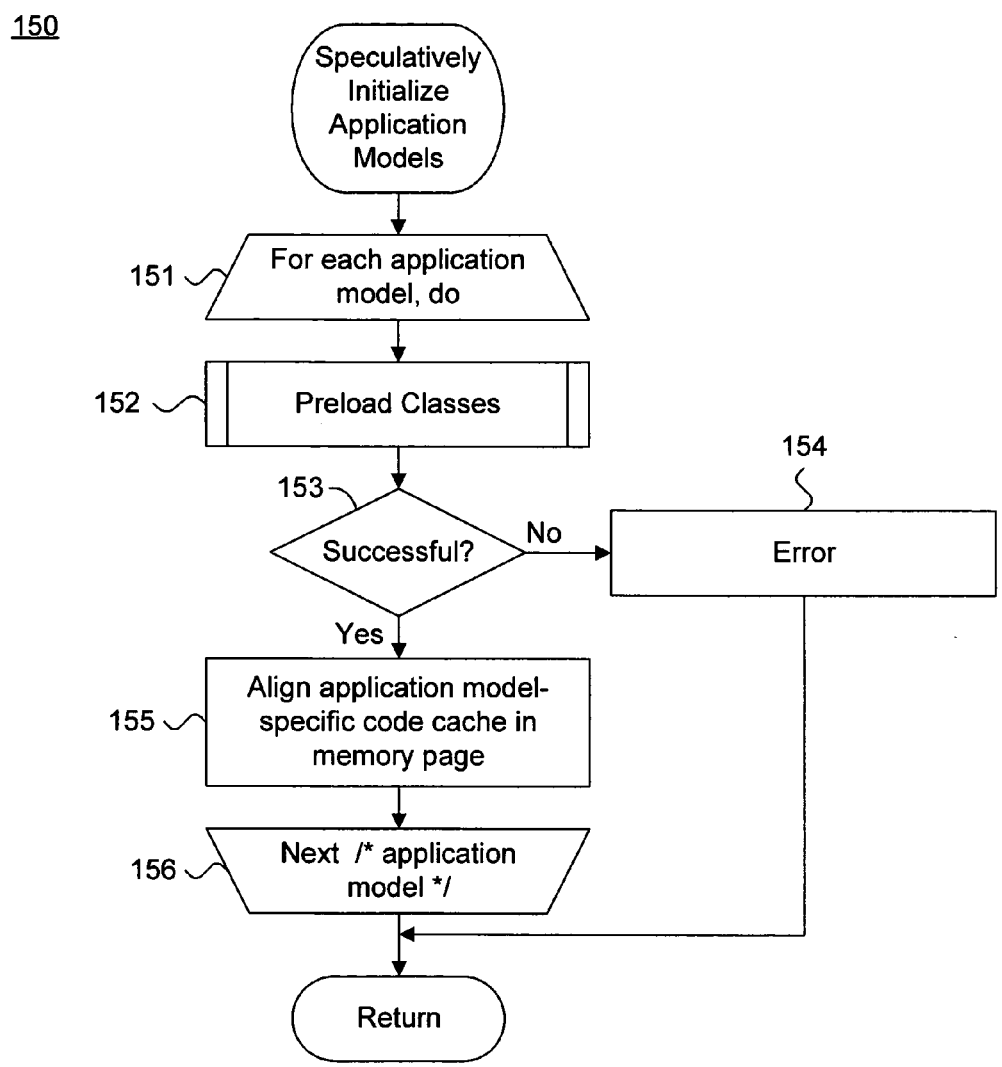
FIG. 10 is a flow diagram showing the routine for performing speculative initialization for use in the routine of FIG. 7.

FIG. 10 is a flow diagram showing the routine 150 for performing speculative initialization for use in the routine 100 of FIG. 7. One purpose of the routine is to preload classes 36 and classes defined in the class libraries 37 specified in the application model-specific class loaders 39 and to align the addresses of the application model-specific code caches 43 on underlying operating system page boundaries.

Each application model is iteratively processed (blocks 151-166) as follows. First, the classes 36 and classes defined in the class libraries 37 specified in the current application model-specific class loaders 39 are preloaded (block 152), as further described below in FIG. 11. If the classes are not successfully preloaded (block 153), an error condition exists (block 154) and the routine returns. Otherwise, the addresses of the applicable application model-specific code cache 43 are preferably aligned on an underlying operating system page boundary (block 154). In one embodiment, aligning the addresses of the application model-specific code caches 43 at underlying operating system page boundaries facilitate efficient memory utilization in cloned JVM processes 34 that are spawned with process cloning with copy-on-write semantics. The application model-specific code cache 43 remains shared until the cloned JVM process 34 attempts to modify the memory page, at which point only the memory page storing the application model-specific code cache 43 is physically copied, thereby avoiding needlessly copying other unaffected data, such as other application model-specific code caches 43. Processing continues with the remaining application models (block 151), after which the routine returns.

Routine for Preloading Application Model-Specific Classes

Figure 11:
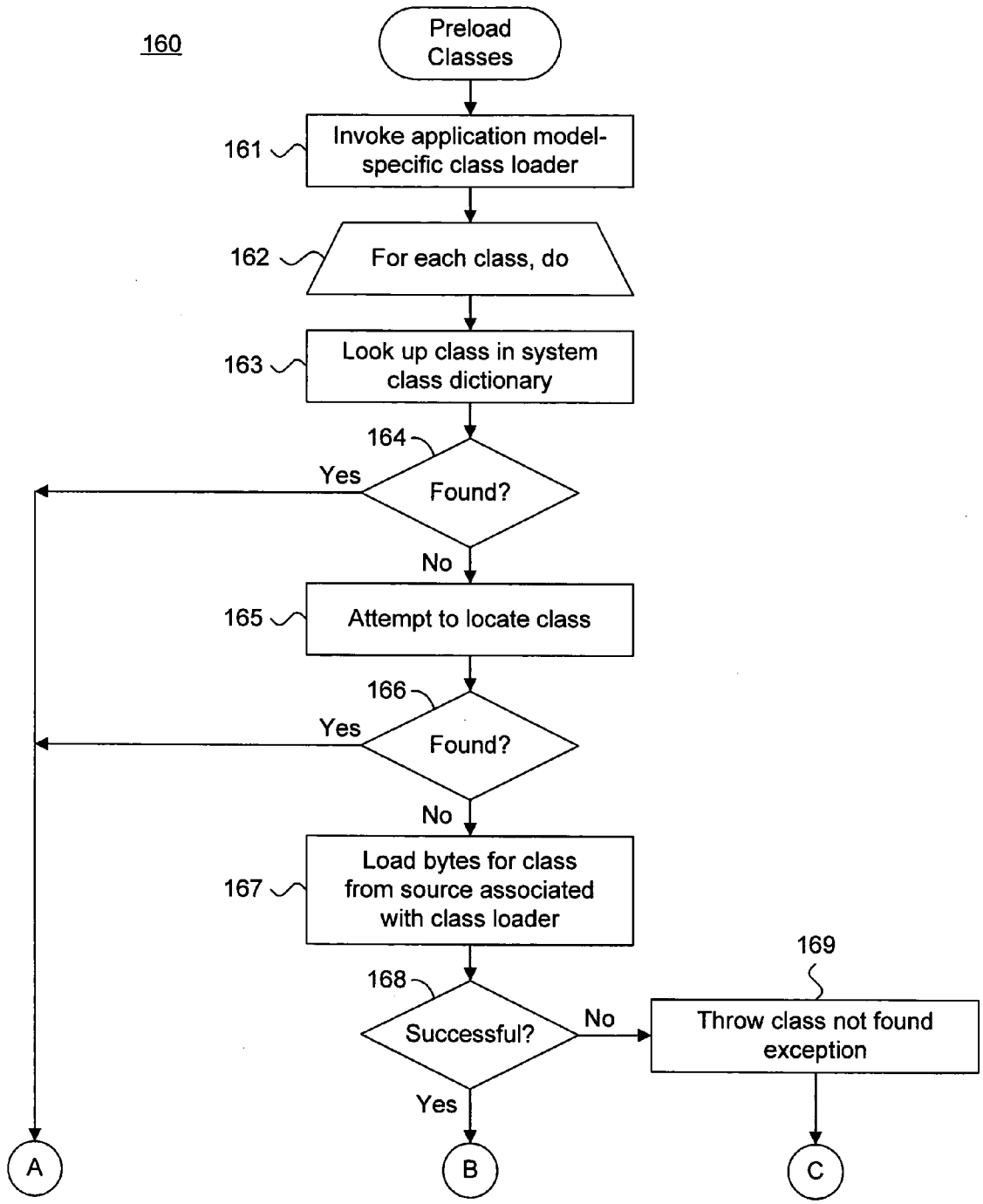
FIG. 11 is a flow diagram showing the routine for preloading application model-specific classes for use in the routine of FIG. 10.
Figure 11:
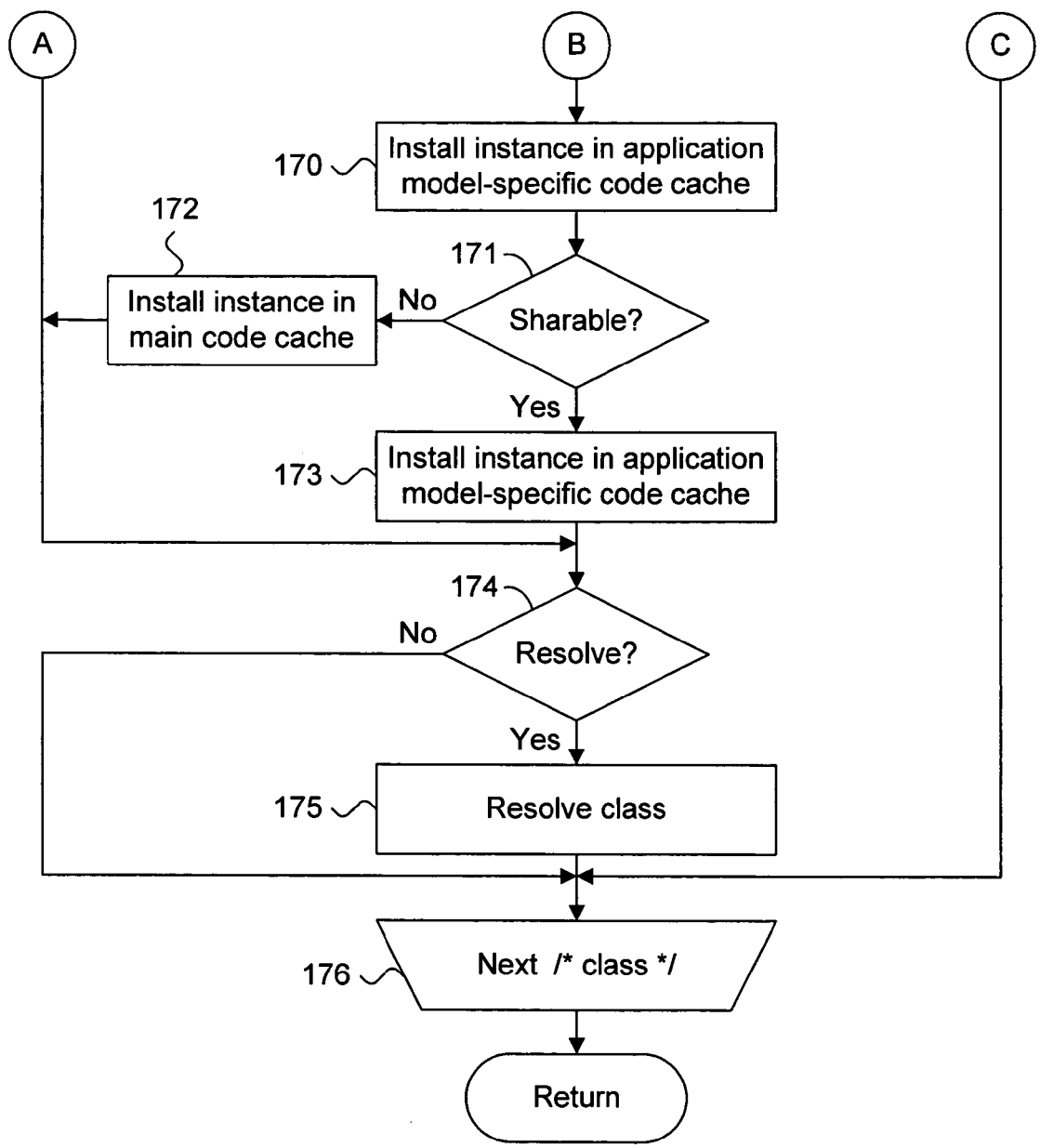

FIG. 11 is a flow diagram showing the routine 160 for preloading application model-specific classes for use in the routine 150 of FIG. 10. One purpose of the routine is to find and instantiate prewarmed instances of classes 36 and classes defined in the class libraries 37 as specified in the current application model-specific class loader 39 as prewarmed state 41 and as compiled shareable methods and non-sharable methods respectively in the main code cache 42 and applicable application model-specific code cache 43 in the master JVM process 33 for inheritance by a cloned JVM process 34.

Initially, the application model-specific class loader 39, as currently selected in the application model processing loop of the calling routine 150 (blocks 151-166 of FIG. 10), is located and invoked by the master JVM process 33 (block 161). Each class 36 and class contained in a class library 37 for the application model is then iteratively processed (blocks 162-175) as follows. First, the master JVM process 33 attempts to locate the class in a system class dictionary (block 163). If the class is found (block 164), no further class loading need be performed. Otherwise, the master JVM process 33 attempts to locate the class (block 165) through standard Java class path location. If the class is found (block 166), no further class loading need be performed. Otherwise, the master JVM process 33 attempts to load the bytes for the class from the source associated with the applicable bootstrap class loader 39 and system application class loader 40 (block 167). If successful (block 168), an instance of the class is created (block 170). If the class is sharable between individual applications (block 171), the class instance is installed in the main code cache 42 (block 172). Otherwise, the class instance is installed in the applicable application model-specific code cache 43 (block 173). If the bytes for the class cannot be loaded from the source (block 168), the master JVM process 33 throws a class not found exception (block 169). Following the loading or attempted loading of the class, if the class requires resolution with respect to symbolic references (block 174), the class is resolved by identifying the applicable class loader for the fully qualified class (block 175). Processing continues with the next class (block 176), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for performing speculative initialization of application models for a cloned runtime system process, comprising:
   a class loader to be created for each application model, each such class loader comprises a representation of at least one class from a source definition provided as object-oriented program code and associated with the application model;
   a master runtime system process to interpret, instantiate and warm up the representation into the class loader as an application model specific class loader instance in a memory space of the master runtime system process; and
   a runtime environment to clone the memory space as a child runtime system process responsive to a process request and to execute the child runtime system process;
   wherein the runtime environment is configured to clone the memory space as a child runtime system process using a copy-on-write process cloning mechanism that instantiates the child runtime system process by copying references to the memory space of the master runtime system process into a separate memory space for the child runtime system process and that defers copying of the memory space of the master runtime system process until the child runtime system process needs to modify the referenced memory space of the master runtime system process.

2. A system according to claim 1, wherein the child runtime process selects one such application model specific class loader instance.

3. A system according to claim 1, further comprising:
   a class loader to load at least one method specified in the class loader into an application model specific code cache in the memory space of the master runtime system process.

4. A system according to claim 3, further comprising:
   a memory loader to align an address of the application model specific code cache on an operating system page boundary within the memory space segregated from at least one other application model specific code cache.

5. A system according to claim 3, further comprising:
   a main code cache comprising one or more instances of shared methods.

6. A system according to claim 3, further comprising:
   a copy-on-write memory space of the child runtime system process to selectively copy only one such application model specific code cache upon use.

7. A system according to claim 1, further comprising:
   a plurality of enumerated application models.

8. A system according to claim 1, further comprising:
   a process cloning mechanism to instantiate the child runtime system process by copying the memory space of the master runtime system process into a separate memory space for the child runtime system process.

9. A system according to claim 1, wherein the master runtime system process is caused to sleep relative to receiving the process request.

10. A system according to claim 1, further comprising:
a resource controller to set operating system level resource management parameters on the child runtime system process.

11. A system according to claim 1, wherein the object-oriented program code is written in a platform-independent programming language.

12. A system according to claim 11, wherein the master runtime system process and the child runtime system process are platform-independent virtual machines.

13. A method for performing speculative initialization of application models for a cloned runtime system process, comprising:
creating a class loader for each application model, each such class loader comprising a representation of at least one class from a source definition provided as object-oriented program code and associated with the application model;
executing a master runtime system process;
interpreting, instantiating and warming up the representation into the class loader as an application model specific class loader instance in a memory space of the master runtime system process; and
cloning the memory space as a child runtime system process responsive to a process request and executing the child runtime system process;
wherein cloning the memory space as a child runtime system process involves instantiating the child runtime system process by copying references to the memory space of the master runtime system process into a separate memory space for the child runtime system process; and
wherein copying references to the memory space of the master runtime system process defers copying of the memory space of the master runtime system process until the child runtime system process needs to modify the referenced memory space of the master runtime system process.

14. A method according to claim 13, wherein the child runtime process selects one such application model specific class loader instance.

15. A method according to claim 13, further comprising:
loading at least one method specified in the class loader into an application model specific code cache in the memory space of the master runtime system process.

16. A method according to claim 15, further comprising:
aligning an address of the application model specific code cache on an operating system page boundary within the memory space segregated from at least one other application model specific code cache.

17. A method according to claim 15, further comprising:
providing a main code cache comprising one or more instances of shared methods.

18. A method according to claim 15, further comprising:
selectively copying only one such application model specific code cache into a copy-on-write memory space of the child runtime system process upon use.

19. A method according to claim 13, further comprising:
enumerating a plurality of application models.

20. A method according to claim 13, further comprising:
instantiating the child runtime system process by copying the memory space of the master runtime system process into a separate memory space for the child runtime system process.

21. A method according to claim 13, further comprising:
causing the master runtime system process to sleep relative to receiving the process request.

22. A method according to claim 13, further comprising:
setting operating system level resource management parameters on the child runtime system process.

23. A method according to claim 13, wherein the object-oriented program code is written in a platform-independent programming language.

24. A method according to claim 23, wherein the master runtime system process and the child runtime system process are platform-independent virtual machines.

25. A computer-readable storage medium holding code for performing the method according to claim 13.

26. An apparatus for performing speculative initialization of application models for a cloned runtime system process, comprising:
means for creating a class loader for each application model, each such class loader comprising a representation of at least one class from a source definition provided as object-oriented program code and associated with the application model;
means for executing a master runtime system process;
means for interpreting, means for instantiating and means for warming up the representation of the class loader as an application model specific class loader instance in a memory space of the master runtime system process; and
means for cloning the memory space as a child runtime system process responsive to a process request and means for executing the child runtime system process;
wherein the means for cloning the memory space is configured to clone the memory space of a child runtime system process using a copy-on-write process cloning mechanism that instantiates the child runtime system process by copying references to the memory space of the master runtime system process into a separate memory space for the child runtime system process and that defers copying of the memory space of the master runtime system process until the child runtime system process needs to modify the referenced memory space of the master runtime system process.

* * * * *